(12) United States Patent
Simionescu et al.

(10) Patent No.: US 9,286,136 B1
(45) Date of Patent: Mar. 15, 2016

(54) HASH-BASED REGION LOCKING

(75) Inventors: Horia C. Simionescu, Foster City, CA (US); Timothy E. Hoglund, Colorado Springs, CO (US); Robert L. Sheffield, Longmont, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 661 days.

(21) Appl. No.: 13/476,474

(22) Filed: May 21, 2012

(51) Int. Cl.
*G06F 3/00* (2006.01)
*G06F 9/52* (2006.01)
*G06F 9/30* (2006.01)

(52) U.S. Cl.
CPC .............. *G06F 9/526* (2013.01); *G06F 9/3004* (2013.01)

(58) Field of Classification Search
CPC .......................... G06F 9/3004; G06F 17/30362
USPC .................................................. 710/5
See application file for complete search history.

(56) References Cited

U.S. PATENT DOCUMENTS

| 7,657,671 | B2 | 2/2010 | Bonwick et al. |
| 2010/0268904 | A1 | 10/2010 | Sheffield et al. |
| 2011/0161552 | A1 | 6/2011 | Lund et al. |
| 2012/0110291 | A1* | 5/2012 | Zilber et al. ................... 711/163 |

* cited by examiner

*Primary Examiner* — Titus Wong

(57) ABSTRACT

A region lock (RL) method and system for ensuring data integrity is disclosed. The method and system in accordance with the present disclosure works in conjunction with a balanced-tree based RL scheme. By eliminating steps and checks that in most cases are unnecessary, the relatively high overhead associated with the balanced-tree based RL scheme may be reduced. For instance, the solution in accordance with the present disclosure may utilize a hash table to determine whether RL overlap checks may be bypassed for certain I/O commands. Since the new solution requires very little processing, therefore by reducing unnecessary RL overlap checks, RL overhead may be dramatically reduced and may lead to significant increases in overall system performance.

20 Claims, 2 Drawing Sheets

HASH-BASED REGION LOCKING

TECHNICAL FIELD

The present invention relates to the field of data storage and particularly to a region lock method and system for ensuring data integrity.

BACKGROUND

In order to ensure data integrity, a mechanism that preserves command order and prohibits data mangling may be implemented in a storage system. For example, processing of I/O (input/output) requests may include management of temporary locks on regions/portions of data stored in logical volumes of the storage system. Such a mechanism may be referred to as LBA (logical block addressing) region locking. LBA region locking may be utilized where multiple processes are accessing a storage volume. Conceptually, such a mechanism locks the LBA region that is currently accessed by one active command, so that no other command can inadvertently access the same LBA region, allowing shared access only under certain conditions.

There are various techniques for implementing region locking and some of the most popular techniques make use of balanced trees such as AVL trees, B-trees or the like. Balanced trees, especially AVL trees, are utilized because they provide good, but most importantly, predictive average and maximum response time, without pathological cases.

However, a balanced-tree based region locking scheme is commonly associated with relatively high overhead. As storage devices become faster and faster, the overhead introduced by such a balanced-tree based region locking scheme may become prohibitive, slowing down the system and preventing the overall system from getting the optimal performance. Therein lies the need to provide a method and system to overcome such shortcomings.

SUMMARY

Accordingly, an embodiment of the present disclosure is directed to a method for obtaining a region lock (RL) for an I/O command. A hash-table may be utilized to determine whether the RL overlap checks for the I/O command may be bypassed based on certain conditions. The method may include mapping the I/O command to a particular hash slot, wherein the hash slot includes a plurality of counters corresponding to a plurality of command types; incrementing a particular counter in the particular hash slot, wherein the command type associated with the particular counter matches the command type of the I/O command; determining whether to bypass RL overlap checks for the I/O command based on values of the plurality of counters in the particular hash slot; and processing the I/O command utilizing a balanced-tree based RL mechanism without performing the RL overlap checks when it is determined that the RL overlap checks can be bypassed for the I/O command.

A further embodiment of the present disclosure is directed to a method for releasing a RL held by an I/O command upon completion of this I/O command. The method may include mapping the I/O command to a particular hash slot, wherein the hash slot includes a plurality of counters corresponding to a plurality of command types; decrementing a particular counter in the particular hash slot, wherein the command type associated with the particular counter matches the command type of the I/O command; determining whether to bypass RL overlap checks for the I/O command based on values of the plurality of counters in the particular hash slot; and releasing the RL held by the I/O command utilizing a balanced-tree based RL mechanism without performing the RL overlap checks when it is determined that the RL overlap checks can be bypassed for the I/O command.

An additional embodiment of the present disclosure is directed to a computer-readable device having computer-executable instructions for performing a region lock method. The region lock method may include steps for obtaining a region lock (RL) for an I/O command and subsequently releasing the RL held by the I/O command upon completion of the I/O command. The steps for obtaining the RL may include mapping an I/O command to a particular hash slot, wherein the hash slot includes a plurality of counters corresponding to a plurality of command types; incrementing a particular counter in the particular hash slot, wherein the command type associated with the particular counter matches the command type of the I/O command; determining whether to bypass RL overlap checks for the I/O command based on values of the plurality of counters in the particular hash slot; and processing the I/O command utilizing a balanced-tree based RL mechanism without performing the RL overlap checks when it is determined that the RL overlap checks can be bypassed for the I/O command. In addition, the steps for releasing the RL may include decrementing the particular counter in the particular hash slot; determining whether to bypass RL overlap checks for the I/O command based on values of the plurality of counters in the particular hash slot; and releasing the RL held by the I/O command utilizing the balanced-tree based RL mechanism without performing the RL overlap checks when it is determined that the RL overlap checks can be bypassed for the I/O command.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

The present disclosure is directed to a region lock (RL) method and system for ensuring data integrity. Instead of replacing a balanced-tree based RL scheme, the new solution in accordance with the present disclosure works in conjunction with it. By eliminating steps and checks that in most cases are unnecessary, the relatively high overhead associated with the balanced-tree based RL scheme may be reduced. For instance, the solution in accordance with the present disclosure may utilize a hash table to determine whether RL overlap checks may be bypassed for certain I/O commands. Since the new solution requires very little processing, therefore by reducing unnecessary RL overlap checks, RL overhead may be dramatically reduced and may lead to significant increases in overall system performance.

It has been observed that in a balanced-tree based RL mechanism, such as the AVL tree-based RL implementation disclosed in U.S. patent application Ser. No. 12/760,434 (the disclosure of which is incorporated herein by reference in its entirety), the RL mechanism requires insertion into the tree of a new node associated with the new command and in addition, checking for conflicting LBA range overlaps with neighboring nodes (depending on the type of region lock requested, e.g., for the "shared" types, LBA range overlaps may be permitted and considered non-conflicting). Checking for conflicting LBA overlaps (may be referred to as overlap checks in the present disclosure) is performed even if the LBA range of the new command is far away from its closest neighbors, and even if all the nodes in the tree have the same "shared" type (they do not conflict).

Figure 1:
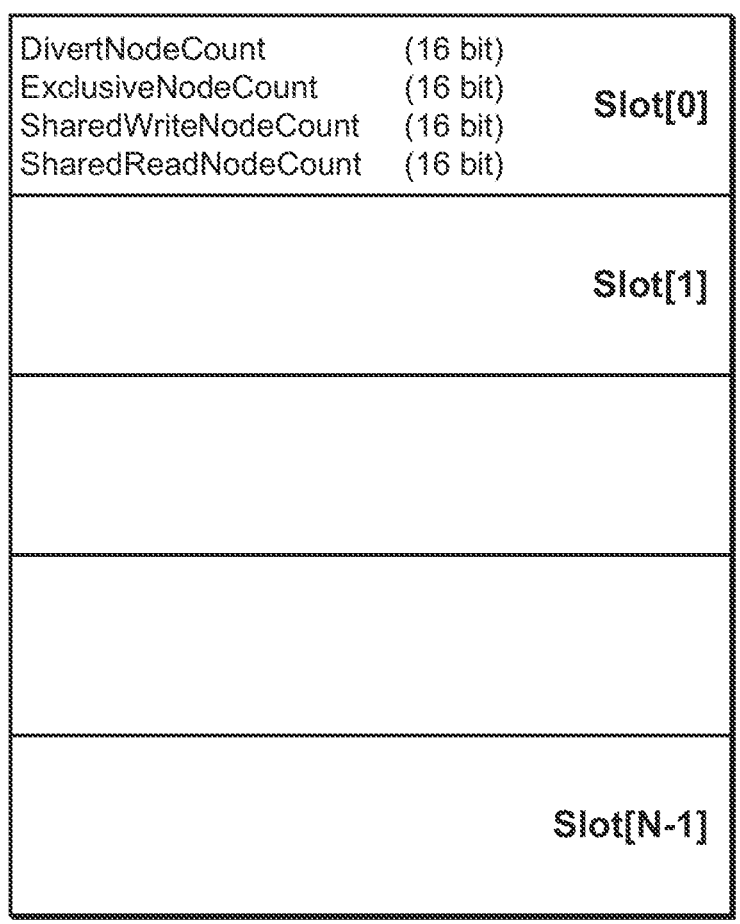
FIG. 1 is an illustration depicting an exemplary hash table in accordance with the present disclosure.

FIG. 1 is an illustration depicting a hash table based RL overlap check bypass module in accordance with the present disclosure. In one embodiment, a single hash table may be utilized for all enabled logical devices (LDs). The hash table may include N slots, where the value of N may be configured to be a power of two in certain implementations, but may also be user-configurable without departing from the spirit and scope of the present disclosure.

Each slot may track the status of I/O commands corresponding to an integer number of LBA rows (status tracking will be described in details below). This allows the RL overlap check bypass module to quickly determine whether a given I/O command would cause any potential conflict among the outstanding commands (if any) corresponding to the rows represented by the same hash slot. The keys utilized to access the slots may include various parameters associated with the given I/O commands. For instance, a hash function may receive as input the row LBA of an I/O command. The hash function may then divide the row LBA by the number of rows represented by the slot. The result may be further divided by the strip size (the part corresponding to one device in the row) and then by the total number of slots. The remainder of these divisions may then be utilized as the slot number, and the content of that particular hash slot may be accessed subsequently.

To track the status of I/O commands corresponding to the rows represented by a slot, each slot may include one or more counters associated with one or more types of I/O commands. Each counter counts only the outstanding commands of a specific region lock type. This provides a major performance improvement because it immediately detects any potential conflict among all the outstanding commands in that hash slot. In one embodiment, each slot may include a divert RL count (DivertNodeCount), an exclusive RL count (ExclusiveNodeCount), a shared write RL count (SharedWriteNodeCount) and a shared read RL count (SharedReadNodeCount). Each of these values may be 16-bit in size, resulting in 8 bytes per slot. Therefore, for an exemplary hash table having 4K slots (i.e., $2^{12}$), the total data size needed for the hash table is only about 32 KB. It is understood, however, that the hash function and the data size depicted above are merely exemplary. Different hash functions, different counters and different data sizes may be utilized to implement the RL overlap check bypass module without departing from the spirit and scope of the present disclosure.

The following pseudo code illustrates an exemplary implementation of the algorithm utilized by the RL overlap check bypass module to determine whether the overlap check may be bypassed for a given I/O command. For instance, this algorithm may be invoked as a part of the get lock (GetLock) or get lock if available (GetIfAvailable) process in a balanced-tree based region locking scheme.

```
// Initially all slot counters are zero and available
// for RL overlap bypass
GetLock / GetIfAvailable
{
    SlotNumber = HashFunction(RowLba,RowSize,NumSlots)
    Read Slot[SlotNumber]
    // Conditionally increment slot counter
    If SlotCounter[type] != 0xFFFF
        Increment SlotCounter[type]
    Else
        ERROR
    Write updated Slot[SlotNumber]
    If type == SharedRead/SharedWrite
        If (SlotCounter values of other types are zero)
            Bypass overlap tests, no conflict for this I/O
        Else
            Proceed to overlap tests as normal
    If type == Exclusive/Divert
        If (SlotCounter values of other types are zero AND
            SlotCounter[type] == 1)
            Bypass overlap tests, no conflict for this I/O
        Else
            Proceed to overlap tests as normal
}
```

As illustrated in the pseudo code above, if the I/O command type is a SharedRead, and the values associated with counters for the other command types (i.e., DivertNodeCount, ExclusiveNodeCount and SharedWriteNodeCount) in the corresponding hash slot are zero, then there would be no conflict for this I/O command and the RL overlap check may be bypassed. Similarly, if the I/O command type is a SharedWrite, and the values associated with counters for the other command types (i.e., DivertNodeCount, ExclusiveNodeCount and SharedReadNodeCount) in the corresponding hash slot are zero, then there would be no conflict for this I/O command and the RL overlap check may be bypassed.

Furthermore, if the I/O command type is an Exclusive command, the values associated with counters for the other command types (i.e., DivertNodeCount, SharedReadNodeCount and SharedWriteNodeCount) in the corresponding hash slot are zero, and the value associated with the counter for the current in-process command (i.e., ExclusiveNodeCount) is one, then there would be no conflict for this I/O command and the RL overlap check may be bypassed.

It is contemplated that for each I/O command that is being processed by the RL overlap check bypass module, an RL node corresponding to this I/O command may be inserted into the balanced-tree. This insertion may be carried out in parallel or subsequent to the execution of the RL overlap check bypass module. If it is determined that the RL overlap check may be bypassed for this command, then the I/O command may be sent into execution immediately with very little overhead incurred (i.e., no overlap checking needs to be performed). On the other hand, if it is determined that the RL overlap check may not be bypassed for this command, then the conventional balanced-tree based LBA range checks may be performed and the execution may proceed normally.

When the execution of a command is completed, the corresponding RL node may be deleted from the balanced-tree, triggering a new RL grant evaluation process (commands that previously have not received RL grants and were suspended may now receive RL grants). The counters in the slot that the completing command has previously incremented, should now be decremented to reflect than one less command is outstanding in the slot. This is illustrated in the following pseudo code as a part of the release lock (ReleaseLock) process.

```
ReleaseLock
{
   SlotNumber = HashFunction(RowLba,RowSize,NumSlots)
   Read Slot[SlotNumber]
   // Conditionally decrement slot counter
   If SlotCounter[type] != 0
      Decrement SlotCounter[type]
   Else
      ERROR
   Write updated Slot[SlotNumber]
   If type == SharedRead/SharedWrite
      If (SlotCounter values of other types are zero)
         Bypass overlap tests, no conflict for this I/O
      Else
         Proceed to overlap tests as normal
   If type == Exclusive/Divert
      If (SlotCounter values of all types are zero)
         Bypass overlap tests, no conflict for this I/O
      Else
         Proceed to overlap tests as normal
}
```

As illustrated in the pseudo code for both obtaining the region lock and releasing the region lock, very little processing is needed to determine whether the RL overlap checks may be bypassed for a particular command. Furthermore, reducing unnecessary RL overlap checks dramatically reduces overhead and increases the overall system performance. It is understood, however, that the specific order or hierarchy of steps in the pseudo code presented above may be rearranged while remaining within the scope of the present disclosure.

It is contemplated that the exemplary implementation of the RL overlap check bypass module illustrated above may support any given I/O command that does not cross more than one row boundary. That is, such an I/O command is mapped (according to the hash function) to one slot in the hash table. However, certain I/O command may span across multiple rows, in which case the hash function may map the I/O command to two or more slots. In such scenarios, In order to make correct determination whether to bypass the RL overlap check, the counters for the type of I/O command in all corresponding slots need to be incremented or decremented together. As a result, the RL overlap check may be bypassed only when the counters in all corresponding slots indicate no conflicting types. Therefore, the RL overlap check bypass module in accordance with the present disclosure may be configured to support any I/O command, regardless of its size.

It is also contemplated that the four types of slot counters depicted in FIG. 1 are merely exemplary. The specific number of counters for each slot, as well as the command types that these counters are associated with, may be determined based on various factors such as the command protocols utilized, the specific implementation of the storage controllers or the like. It is understood that some of the counters depicted in FIG. 1 may be removed, and/or additional counter may be added, without departing from the spirit and scope of the present disclosure.

Furthermore, it is contemplated that the RL overlap check bypass module in accordance with the present disclosure has a minimal impact to the processing of existing balanced-tree based RL mechanisms. The bypass module does not interfere with inserting and maintaining the nodes in the balanced-tree. Instead, the bypass module only determines whether certain unnecessary overlap checks may be bypassed to reduce processing overhead. In addition, the bypass module provides granularity of overlap checks to less than an entire LD. The bypass module may also be enabled or disable at the LD level.

It is also contemplated that the RL overlap check bypass module in accordance with the present disclosure may be invoked conditionally. For instance, certain I/O commands may be indicated and/or configured to be sent directly to the balanced-tree based RL mechanism without invoking the hash-based bypass module. Such conditions may be determined based on certain command types, specific initiators or destination addresses or the like without departing from the spirit and scope of the present disclosure.

Figure 2:
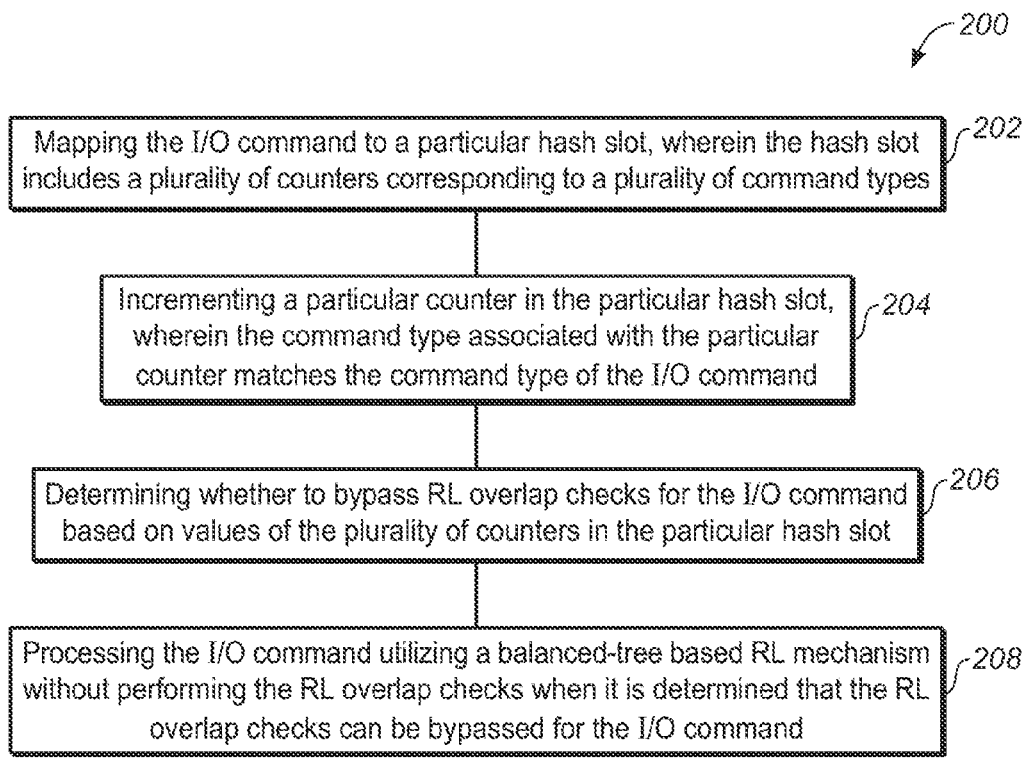
FIG. 2 is a flow diagram illustrating a method for obtaining region lock utilizing the hash table in accordance with the present disclosure.

FIG. 2 shows a flow diagram illustrating a method 200 for obtaining a region lock (RL) for an I/O command. Upon receiving the I/O command, step 202 may map the I/O command to a particular hash slot (or multiple slots if the I/O command crosses more than one row as describe above). The hash slot may include a plurality of counters corresponding to a plurality of command types. Step 204 may increment a particular counter in the hash slot that corresponds to the command type of the I/O command. Step 206 may determine whether to bypass RL overlap checks for the I/O command based on values of the plurality of counters in the hash slot as previously described. If it is determined that the RL overlap checks can be bypassed for the I/O command, step 208 may process the I/O command utilizing a balanced-tree based RL mechanism without performing the RL overlap checks. Otherwise, normal balanced-tree based RL processing may be utilized to handle the I/O command.

Figure 3:
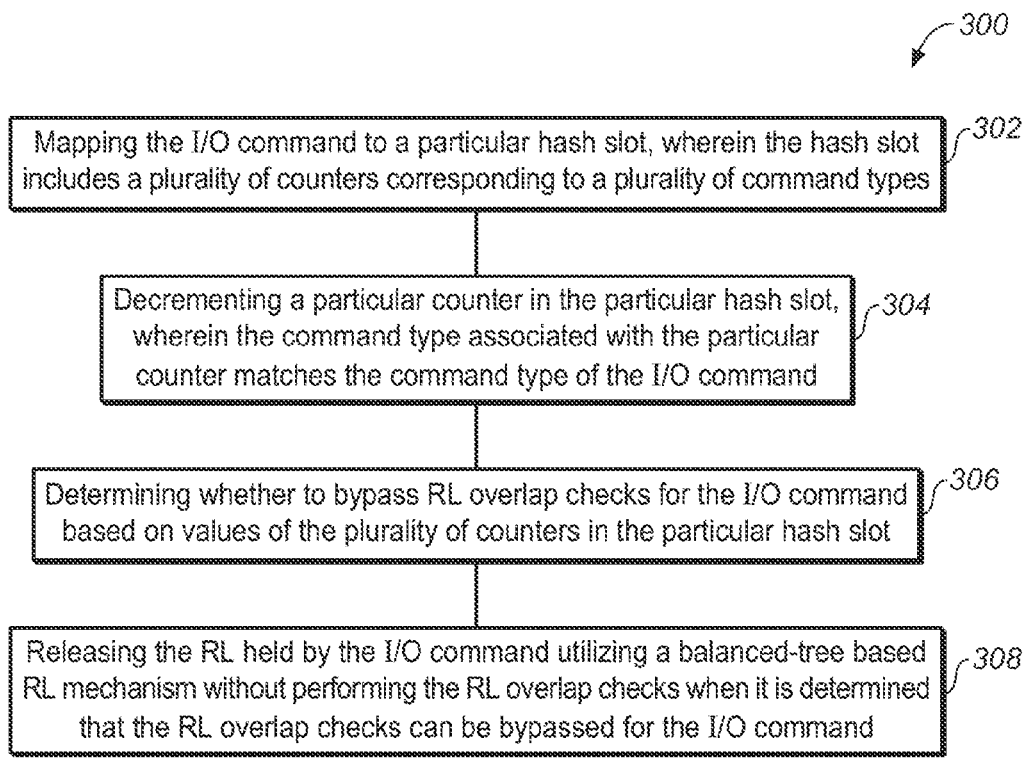
FIG. 3 is a flow diagram illustrating a method for releasing region lock utilizing the hash table in accordance with the present disclosure.

FIG. 3 shows a flow diagram illustrating a method 300 for releasing a region lock (RL) held by an I/O command. Step 302 may map the I/O command to a particular hash slot (or multiple slots if the I/O command crosses more than one row as describe above). The hash slot may include a plurality of counters corresponding to a plurality of command types. Step 304 may decrement a particular counter in the hash slot that corresponds to the command type of the I/O command. Step 306 may determine whether to bypass RL overlap checks for the I/O command based on values of the plurality of counters in the hash slot as previously described. If it is determined that the RL overlap checks can be bypassed for the I/O command, step 308 may releasing the RL held by the I/O command utilizing a balanced-tree based RL mechanism without performing the RL overlap checks. Otherwise, normal balanced-tree based RL processing may be utilized to handle the release of the region lock.

It is to be understood that the present disclosure may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for obtaining a region lock (RL) for an I/O command, the method comprising:
   mapping the I/O command to a particular hash slot, wherein the hash slot includes a plurality of counters corresponding to a plurality of command types;
   incrementing a particular counter in the particular hash slot, wherein the command type associated with the particular counter matches the command type of the I/O command;
   determining whether to bypass RL overlap checks for the I/O command based on values of the plurality of counters in the particular hash slot; and
   processing the I/O command utilizing a balanced-tree based RL mechanism without performing the RL overlap checks when it is determined that the RL overlap checks can be bypassed for the I/O command.

2. The method of claim 1, wherein the plurality of counters include at least one of: a shared write RL counter, a shared read RL counter, an exclusive RL counter, and a divert RL counter.

3. The method of claim 1, wherein determining whether to bypass RL overlap checks for the I/O command further comprises:
   determining whether the I/O command is a shared read type command or a shared write type command; and
   indicating that the RL overlap checks can be bypassed for the I/O command when: 1) the I/O command is a shared read type command or a shared write type command; and 2) all other counters of the plurality of counters in the hash slot are zero.

4. The method of claim 1, wherein determining whether to bypass RL overlap checks for the I/O command further comprises:
   determining whether the I/O command is an exclusive type command or a divert type command; and
   indicating that the RL overlap checks can be bypassed for the I/O command when: 1) the I/O command is an exclusive type command or a divert type command; 2) a particular counter of the plurality of counters in the hash slot that corresponds to the command type of said I/O command is one; and 3) all other counters of the plurality of counters in the hash slot are zero.

5. The method of claim 1, further comprising:
   inserting the I/O command into the balanced-tree, wherein the inserting step is carried out in parallel with at least one of: the mapping step, the incrementing step or the determining step.

6. The method of claim 1, further comprising:
   processing the I/O command utilizing the balanced-tree based RL mechanism with RL overlap checks when it is determined that the RL overlap checks cannot be bypassed for the I/O command.

7. The method of claim 1, wherein the I/O command is mapped to a plurality of hash slots, a corresponding counter in each of the plurality of hash slots is incremented, and whether to bypass RL overlap checks for the I/O command is determined based on the values of the counters in each of the plurality of hash slots.

8. A method for releasing a region lock (RL) held by an I/O command, the method comprising:
   mapping the I/O command to a particular hash slot, wherein the hash slot includes a plurality of counters corresponding to a plurality of command types;
   decrementing a particular counter in the particular hash slot, wherein the command type associated with the particular counter matches the command type of the I/O command;
   determining whether to bypass RL overlap checks for the I/O command based on values of the plurality of counters in the particular hash slot; and
   releasing the RL held by the I/O command utilizing a balanced-tree based RL mechanism without performing the RL overlap checks when it is determined that the RL overlap checks can be bypassed for the I/O command.

9. The method of claim 8, wherein the plurality of counters include at least one of: a shared write RL counter, a shared read RL counter, an exclusive RL counter, and a divert RL counter.

10. The method of claim 8, wherein determining whether to bypass RL overlap checks for the I/O command further comprises:
    determining whether the I/O command is a shared read type command or a shared write type command; and
    indicating that the RL overlap checks can be bypassed for the I/O command when: 1) the I/O command is a shared read type command or a shared write type command; and 2) all other counters of the plurality of counters in the hash slot are zero.

11. The method of claim 8, wherein determining whether to bypass RL overlap checks for the I/O command further comprises:
    determining whether the I/O command is an exclusive type command or a divert type command; and
    indicating that the RL overlap checks can be bypassed for the I/O command when: 1) the I/O command is an exclusive type command or a divert type command; and 2) all counters of the plurality of counters in the hash slot are zero.

12. The method of claim 8, further comprising:
    releasing the RL held by the I/O command utilizing the balanced-tree based RL mechanism with RL overlap checks when it is determined that the RL overlap checks cannot be bypassed for the I/O command.

13. The method of claim 8, wherein the I/O command is mapped to a plurality of hash slots, a corresponding counter in each of the plurality of hash slots is decremented, and whether to bypass RL overlap checks for the I/O command is determined based on the values of the counters in each of the plurality of hash slots.

14. A non-transitory computer-readable storage device having computer-executable instructions for performing a region lock method, the method comprising:
    obtaining a region lock (RL) for an I/O command, further comprising:
       mapping an I/O command to a particular hash slot, wherein the hash slot includes a plurality of counters corresponding to a plurality of command types;

incrementing a particular counter in the particular hash slot, wherein the command type associated with the particular counter matches the command type of the I/O command;

determining whether to bypass RL overlap checks for the I/O command based on values of the plurality of counters in the particular hash slot; and processing the I/O command utilizing a balanced-tree based RL mechanism without performing the RL overlap checks when it is determined that the RL overlap checks can be bypassed for the I/O command; and releasing the RL held by the I/O command upon completion of the I/O command, further comprising:

decrementing the particular counter in the particular hash slot;

determining whether to bypass RL overlap checks for the I/O command based on values of the plurality of counters in the particular hash slot; and releasing the RL held by the I/O command utilizing the balanced-tree based RL mechanism without performing the RL overlap checks when it is determined that the RL overlap checks can be bypassed for the I/O command.

15. The non-transitory computer-readable storage device of claim 14, wherein the plurality of counters include at least one of: a shared write RL counter, a shared read RL counter, an exclusive RL counter, and a divert RL counter.

16. The non-transitory computer-readable storage device of claim 14, wherein determining whether to bypass RL overlap checks for the I/O command when obtaining the RL further comprises:

determining whether the I/O command is a shared read type command or a shared write type command; and indicating that the RL overlap checks can be bypassed for the I/O command when: 1) the I/O command is a shared read type command or a shared write type command; and 2) all other counters of the plurality of counters in the hash slot are zero.

17. The non-transitory computer-readable storage device of claim 14, wherein determining whether to bypass RL overlap checks for the I/O command when obtaining the RL further comprises:

determining whether the I/O command is an exclusive type command or a divert type command; and indicating that the RL overlap checks can be bypassed for the I/O command when: 1) the I/O command is an exclusive type command or a divert type command; 2) a particular counter of the plurality of counters in the hash slot that corresponds to the command type of said I/O command is one; and 3) all other counters of the plurality of counters in the hash slot are zero.

18. The non-transitory computer-readable storage device of claim 14, wherein determining whether to bypass RL overlap checks for the I/O command when releasing the RL further comprises:

determining whether the I/O command is a shared read type command or a shared write type command; and indicating that the RL overlap checks can be bypassed for the I/O command when: 1) the I/O command is a shared read type command or a shared write type command; and 2) all other counters of the plurality of counters in the hash slot are zero.

19. The non-transitory computer-readable storage device of claim 14, wherein determining whether to bypass RL overlap checks for the I/O command when releasing the RL further comprises:

determining whether the I/O command is an exclusive type command or a divert type command; and indicating that the RL overlap checks can be bypassed for the I/O command when: 1) the I/O command is an exclusive type command or a divert type command; and 2) all counters of the plurality of counters in the hash slot are zero.

20. The non-transitory computer-readable storage device of claim 14, further comprising:

processing the I/O command utilizing the balanced-tree based RL mechanism with RL overlap checks when it is determined that the RL overlap checks cannot be bypassed for the I/O command.

* * * * *